(12) United States Patent
Abel et al.

(10) Patent No.: US 7,379,470 B2
(45) Date of Patent: May 27, 2008

(54) COMBINED AND DATA COMPRESSED FIFO BASED ARBITRATION FOR A NON-BLOCKING SWITCH

(75) Inventors: Francois Abel, Rneschlikon (CH); Gottfried Andreas Goldrian, Boeblingen (DE); Ingemar Holm, Stuttgart (DE); Helmut Kohler, Moensheim (DE); Norbert Schumacher, Neuhausen (DE)

(73) Assignee: International Business Machines Coproration, Armonk, NY (US)

( * ) Notice: Subject to any disclaimer, the term of this patent is extended or adjusted under 35 U.S.C. 154(b) by 796 days.

(21) Appl. No.: 10/425,133

(22) Filed: Apr. 28, 2003

(65) Prior Publication Data

US 2005/0099945 A1 May 12, 2005

(30) Foreign Application Priority Data

Apr. 26, 2002 (EP) .................. 02009571

(51) Int. Cl.
*H04L 12/54* (2006.01)

(52) U.S. Cl. .................... 370/422; 370/381

(58) Field of Classification Search ............... 370/360, 370/380, 381, 382, 383, 384, 422, 423, 427; 710/51, 53
See application file for complete search history.

(56) References Cited

U.S. PATENT DOCUMENTS

| | | | |
|---|---|---|---|
| 5,838,937 A * | 11/1998 | Lee et al. ................... 710/316 |
| 6,393,021 B1 * | 5/2002 | Chow et al. ................ 370/378 |
| 6,490,630 B1 * | 12/2002 | Poon et al. ................. 709/235 |
| 6,658,015 B1 * | 12/2003 | Merchant et al. ........... 370/422 |
| 6,839,413 B1 * | 1/2005 | Brock et al. ............. 379/93.08 |

\* cited by examiner

*Primary Examiner*—Ricky Q. Ngo
*Assistant Examiner*—Pao Sinkantarakorn
(74) *Attorney, Agent, or Firm*—John E. Campbell; Floyd A. Gonzalez

(57) ABSTRACT

A method and system for switching data packets through a multiple (m) input, multiple (n) output switching device providing a switching method having a fast one-cycle throughput. A respective switching device behaves like an output queued switch from a set of distributed output queues reading the incoming input control information from the plurality of input ports (IP) and compresses the information in a form which allows an easy association with a respective output port (OP) to which an individual input port is temporarily mapped.

14 Claims, 9 Drawing Sheets

50 - gnr bits for group 0          52 - gpnr for port 0,1,2,3

| State | cycle 0 | | | | |
|---|---|---|---|---|---|
| Bitpos | 0 | 1 | 2 | 3 | 4 |
| | 012 345 | 6 7890 123 | 45678901 234 | 56789012 345 | 67890123 |
| Reg in | 000 (1111) xxxx | xxx xxxxxxx | xxx xxxxxxx | xxx xxxxxxx | xxx xxxxxxx |
| Back up in | xxx xxxxxxxx xxx xxxxxxx xxx xxxxxxx xxx xxxxxxx xxx xxxxxxx | | | | |
| Sram in | no write | | | | |

| State | cycle 0 | | | | |
|---|---|---|---|---|---|
| Bitpos | 5 | 6 | 7 | 8 | |
| | 456 78901234 567 | 89012345 678 | 90123456 789 | 01234567 | |
| Reg in | xxx xxxxxxxx xxx | xxxxxxxx xxx | xxxxxxxx xxx | xxxxxxxx | |
| Back up in | xxx xxxxxxxx xxx xxxxxxxx xxx xxxxxxxx xxx xxxxxxxx | | | | |
| Sram in | no write | | | | |

54 x: don't care

FIG. 5A

| State | cycle 1 | |
|---|---|---|
| Bitpos | 0              1            2           3           4<br>012 34567890 123 45678901 234 56789012 345 67890123 | |
| Reg in | xxx xxxxxxxx 000 1xxxxxxx 001 xxxxxx11 xxx xxxxxxxx | |
| Back up in | xxx xxxxxxxx xxx xxxxxxxx xxx xxxxxxxx xxx xxxxxxxx | |
| Sram in | no write | |

| State | cycle 1 | |
|---|---|---|
| Bitpos | 5              6            7           8<br>456 78901234 567 89012345 678 90123456 789 01234567 | |
| Reg in | xxx xxxxxxxx xxx xxxxxxxx xxx xxxxxxxx xxx xxxxxxxx | |
| Back up in | xxx xxxxxxxx xxx xxxxxxxx xxx xxxxxxxx xxx xxxxxxxx | |
| Sram in | no write | | x: don't care

FIG. 5B

| State | cycle 2 | | | | |
|---|---|---|---|---|---|
| Bitpos | 0<br>012 34567890 123 45678901 234 56789012 345 67890123 | 1 | 2 | 3 | 4 |
| Reg in | xxx xxxxxxxx xxx xxxxxxxx xxx xxxxxxxx 000 11111111 | | | | |
| Back up in | 101 11111111 110 11111111 111 11111111 xxx xxxxxxxx | | | | |
| Sram in | 000 1111xxxx 000 1xxxxxxx 001 xxxxxx11 000 11111111 | | | | |

| State | cycle 2 | | | | |
|---|---|---|---|---|---|
| Bitpos | 5<br>456 78901234 567 89012345 678 90123456 789 01234567 | 6 | 7 | 8 | |
| Reg in | 001 11111111 010 11111111 011 11111111 100 11111111 | | | | |
| Back up in | xxx xxxxxxxx xxx xxxxxxxx xxx xxxxxxxx xxx xxxxxxxx | | | | |
| Sram in | 001 11111111 010 11111111 011 11111111 100 11111111 | | | | | x: don't care

FIG. 5C

COMBINED AND DATA COMPRESSED FIFO BASED ARBITRATION FOR A NON-BLOCKING SWITCH

BACKGROUND OF THE INVENTION

The present invention relates to switching technology in computer networks. More particularly it refers to a method and system for switching information packets through a multiple (m) input, multiple (n) output switching device.

During the last years the data traffic through electronic networks has increased remarkably. This tendency was strongly triggered by the general acceptance and frequent use of the Internet by private persons and enterprises.

In general, the data is transferred in packets from a start node to an end node of a respective data transmission. Between start node and end node in general, a plurality of nodes are used during packet transmission at which a packet is routed in one—when monocast—and into several directions—when multicast transmission—in order to arrive finally at the end node.

At any intermediate node a kind of switching device is provided having a number of m input ports and a number of n output ports that routes the packets according to the intended target node. The physical line onto which this is done is called a link. Thus, in a network the nodes are connected by one or more links which are often full duplex links which allow simultaneous communications in both directions. Both ends of each link are terminated by a 'link-circuit' which is also called a port.

A switch is thus a key component of the entire network. It is called non-blocking when it can simultaneously interconnect several pairs of selected links. It is also called a cut-through switch when it can begin re-transmitting (i.e., forwarding) data packets well before the complete packet has been received. Further, a modern switch supports multiple priorities or class of traffic per port, further referred to herein as lanes.

In European patent application EP 0404423 a respective disclosure can be found related to the specific prior art network switches. This disclosure is incorporated herein by reference.

The problem concerned with the present invention is now in more detail the following: The basic principle of any switch fabric is to route incoming packets from any of the m input ports to one or more of the n output ports.

The prior art disclosure M. Kateavenis, P. Vatsolaki, and A. Efthymiou, "Pipelined Memory Shared Buffer for VLSI Switches", ACM SIGCOMM'95, MA USA, August 1995, pp.39-48, gives an overview on different ways of building a switch fabric by using various queuing systems such as Input Queuing (IQ), Output Queuing (OQ) or Combined Input and Output Queuing (CIOQ).

A switch fabric that places incoming packets in a queue that is dedicated to its outgoing line where it waits until departing of the switch, is called an output queued or output buffered switch fabric. This approach is considered to be the reference switch model as it provides the optimum delay-throughput performance for all traffic distributions. But this architecture is also considered to have limited scalability because the required internal bandwidth or speedup (S)—defined as the number of times that the switch core works faster than the input line rate—is equal to number of input ports (S=m). This makes output queuing impractical for switches with high line rates or with large number of ports, because memories with sufficient bandwidth are simply not available.

Therefore, most high performance switch (both research and commercial) have chosen architectures employing input queuing (also referred as input buffering) to reduce cost and simplify the implementation.

An input queued architecture is considered to be more scalable and its implementation does not have the restriction of an OQ model because the core fabric only needs to work at the input line rate (S=1). However, IQ based switches need to resolve input and output contention by means of arbiters at the inputs and outputs. Maximum matching algorithms have been proposed to achieve 100% throughput, but their high complexity make them unfeasible to implement for high-speed systems. These are schemes such as Longest Port Queuing (LPQ), Oldest Cell First (OCF) and Longest Port First (LPF). Maximal matching such as iSLIP, Dual Round-Robin Matching (DRRM) and Longest Output Occupancy First Alorithm (LOOFA) have been considered as an alternative to maximum matching schemes. These schemes are less complex to implement, but still because of the high requirements put on these arbiters, only switches with small number of ports (i.e 32 for iSLIP) have been proposed. Another drawback of IQ switches is that guaranteed Quality of Service (QoS) is usually difficult to implement. The reason is that packets not only contend for an output port, they also contend for entry into the switch fabric with packets that are destined for other outputs. This places a packet at the mercy of other packets destined for other outputs, and makes the packet latency difficult to control, unless a mechanism is provided to resolve input contention.

For a long time, buffered crossbars have been considered as the solution to improve switching throughput. A buffered crossbar has buffering at each crosspoint, meaning that incoming packets are queued per output at every inputs. This architecture takes advantage of the IQ implementation scalability by requiring a switch core that only operates at the input line rate (S=1), while also providing all the delay-throughput characteristics of an OQ switch.

From a queuing system point of view, a buffered crossbar can be seen as an output queued switch having distributed output queues instead of a centralized output queue. In order to behave identically to an OQ switch, a buffered crossbar requires an arbitration scheme between the physical distributed queues to recreate a logical output queue. (FIG. 1a). The conventional crosspoint-buffer-type switch adopts ring arbitration to search for a crosspoint buffer that has a request to send a packet to the output line. Because this scheme is known to be limited by the number of input ports and by the transmission delay of the control signals in each crosspoint, approaches such as Round-Robin (RR) or Weighted Round-Robin (WRR) arbitration are usually preferred.

However, even if their implementation is more scaleable, RR and WRR arbitration also experiment problems when both the input port increases to large numbers (i.e 128~256) and the line rate increases in the range of tens of Gb/s. The reason is that packet time decreases as the input/output line rate increases, which puts a strong dependency on the high-speed logic that performs the arbitration decision within one packet cycle.

Also, although the RR and the WRR arbitration are suitable for many communication applications, their behavior may not be acceptable when the aim is to approximate or emulate a real output queued switch. In particular, some computer applications may require that the sequence of incoming packets among multiple input ports gets maintained. In those cases, more complex algorithms such as fair queuing type of algorithms are required, which again will limit the buffer crossbar scalability.

BRIEF SUMMARY OF THE INVENTION

It is thus an objective of the present invention to provide a switching method and a system that emulates the exact behavior of an ideal Output Queue (OQ) from a set of distributed output queues, and still allows the switching device to scale in both, number of ports and line rate, still avoiding any complex arbitration.

This objective of the invention is achieved by the features stated in enclosed independent claims. Further advantageous arrangements and embodiments of the invention are set forth in the respective subclaims. Reference should now be made to the appended claims.

In order to provide a switching method having a fast one-cycle throughput and to design a respective switching device with smaller chip area consumption it is proposed to read the incoming input control information from the plurality of input ports and compress it in a form which allows an easy association with a respective output port to which an individual input port is currently mapped. In order to save chip area it is proposed to provide one buffering device per output and per lane and to store respective subsets of said compressed control information according to an output port indication which is evaluated from the packet header information. Then the output port numbers are used within prior art control logic for addressing the use and distributed data and switching it according to the input port/output port mapping. Advantageously, the input port numbers are encoded within data compression.

Thus, basically the buffering of input control information in such a compressed form allows for significantly reducing the number of buffer components in use, for example SRAM-memories, compared to the above-cited prior art disclosing a matrix of FIFO storage elements, by more than 80 percent. This has significant effects in chip area saving.

Advantageously, the compressing step is done according to the following scheme:

The total of input ports is divided into a plurality of subgroups which are addressable by a respective input port subgroup index or number, abbreviated further herein as GNR.

Each subgroup covers a predetermined plurality of input ports. Further, some subgroup indication means is provided for each subgroup in order to track at which input port of a subgroup data is concurrently present. This is based on the consideration that it is required basically to store the information for each subgroup, at which of the subgroup members, i.e. at which of the input ports of a respective subgroup data is concurrently present in a cycle. Thus, when a subgroup has for example a number of 8 members, then a number between 0 and 8 input port identifiers has to be stored.

Advantageously, the above-mentioned subgroup indication means is a bit sequence indicating the respective port numbers within a subgroup. It is thus abbreviated as GPNR, i.e., subgroup port number.

Thus, when a subgroup has 8 members, in the maximum case a number of 8 bit sequences is used, wherein each bit sequence, i.e. GPNR, consists of a number of three bits in order to cover $2^3=8$ subgroup members. Thus, by combining the above-mentioned subgroup number GNR with the plurality of subgroup port number bits, GPNR, the relevant input control information can be advantageously stored in a compressed form.

Advantageously, each bit of the above-mentioned bit sequence encodes or is derived from a respective input port number within the corresponding subgroup.

When each subgroup covers a number of 8 input ports in a total of 64 input ports of a respective 64 input port switching device, an efficient compression can be achieved. Further, when the switching device supports switching in multiple priority levels, i.e. lanes, then it is advantageous to provide a plurality of buffer storages per lane and per output port. Thus, when a plurality of 4 lanes is supported and the switching device has a plurality of 16 output ports, then a number of 4*16=64 buffer storages is provided in order to simplify the control logic within the switching device.

When the buffer storages are FIFO-operated SRAM memory devices a fast operation of the switching device can be achieved.

Further, the switching method may comprise the additional step of controlling if a buffer storage in use does not hold data and to bypass the buffer storage in this case. Thus, one cycle can be saved in such situations.

The presently disclosed switching method can be advantageously implemented in a chip circuit for switching devices. It provides all the intrinsic characteristics of an OQ switch such as: maximized throughput, optimum delay-throughput performance for all traffic distributions (the waiting time performance represents the best achievable by any approach), separation of packet flows destined to different outputs (packets cannot interfere with each other, i.e., block or delay), easier QoS support (packet latency can be controlled by scheduling to provide guaranteed QoS) and easier multicast support.

The present invention thus represents an enhanced scheduling method in particular dedicated to limit the arbitration complexity and maintain low latency, while saving chip area. It ensures fairness and best traffic management without a complex traffic control logic as this is the case within prior art arbiters with special weights.

The basic principle of the present invention is independent of the number of input ports or output ports or lanes in use. Having any particular numbers of input ports, output ports and lanes, a simple calculation concerning the size of the subgroups in use will yield an optimum compression.

BRIEF DESCRIPTION OF THE SEVERAL VIEWS OF THE DRAWING

These and other objects will be apparent to one skilled in the art from the following detailed description of the invention taken in conjunction with the accompanying drawings in which:

FIG. 5A to 5C are table-like representations of system bit values in a sequence of three subsequent cycles.

DETAILED DESCRIPTION OF THE INVENTION

Figure 1:
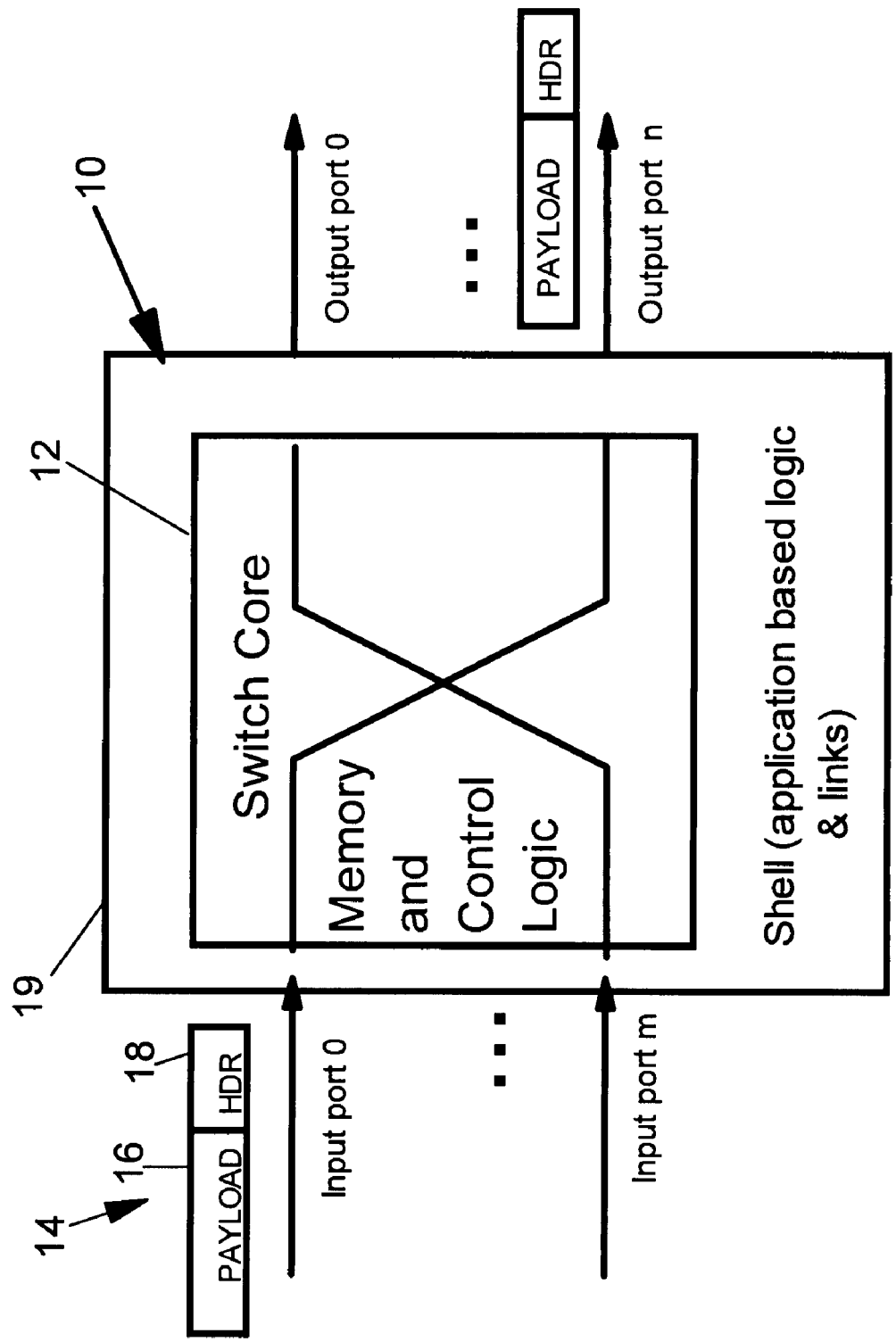
FIG. 1 is a schematic overview representation of a prior art switch fabric which can be improved by the present invention.

With general reference to the figures and with special reference now to FIG. 1 a prior art switch chip 10 comprises an actual switching core 12 having some memory and control logic in order to switch data packets from a number of m input ports to a number of n output ports. Each packet 14 comprises a section 16 for the payload, i.e. the use data and a header section 18 which comprises any control data in order to enable correct routing of a packet. A shell 19 comprises some application-based logic and links in order to embed the core according to the specific requirements in a particular location of the switching network or according to a particular application for which the switching network is actually in use. This switching network may now be improved by the inventive principles, illustrated in more detail with reference to FIG. 1a, and 2 to FIG. 5.

Figure 1A:
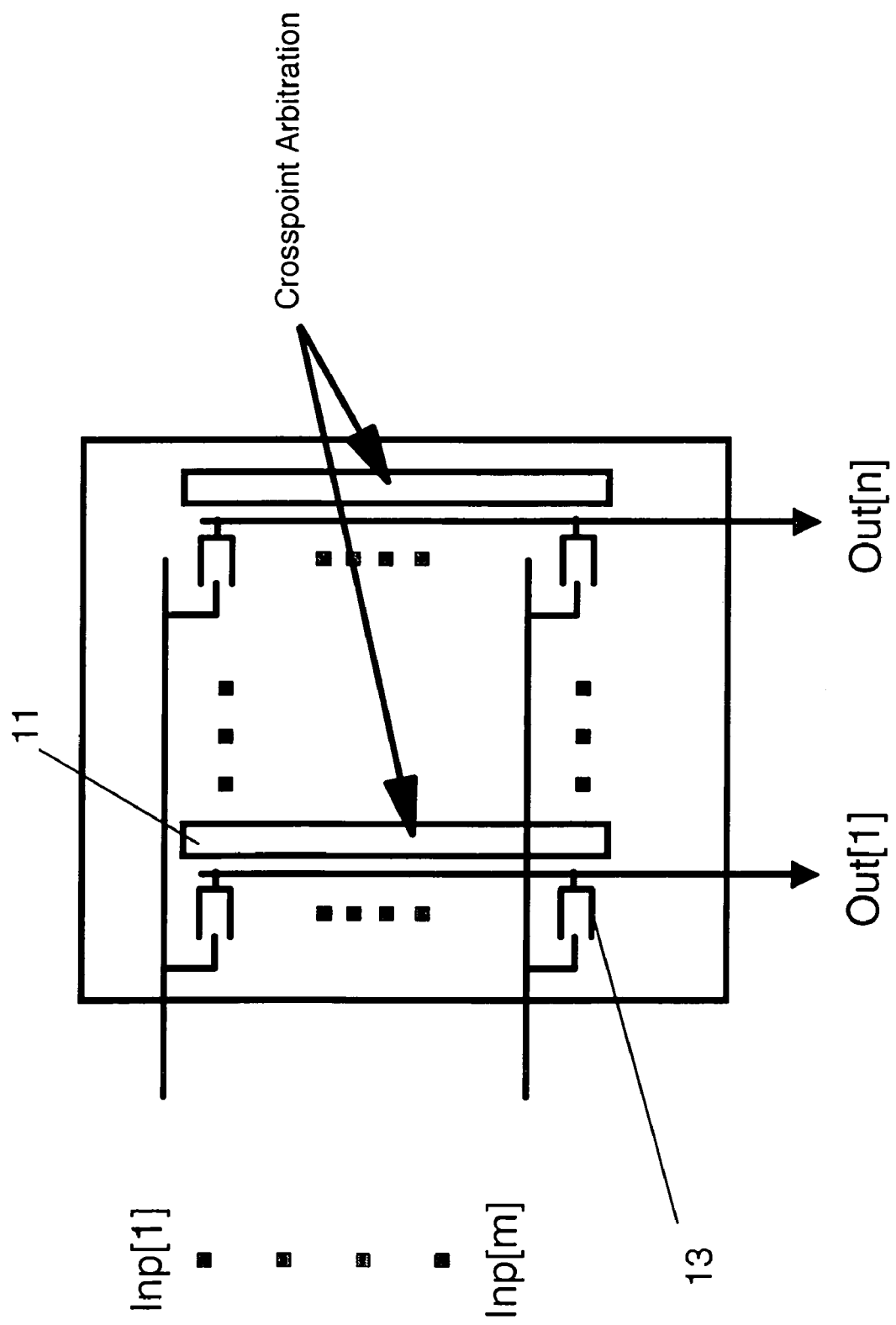
FIG. 1a is a schematic representation of a buffered crossbar for which the present invention is particularly applicable.

With additional reference to FIG. 1a, a possible implementation of the switching core 12 is represented introducing the present invention and comprises a buffer crossbar for which the present invention is particularly applicable.

In this particular example, each output port of the switch core comprises a set of distributed output queues 13 and a specific crosspoint arbiter 11. This kind of switching core, and more precisely its crosspoint arbitration scheme, may be particularly improved with the invention principles described below.

Figure 2:
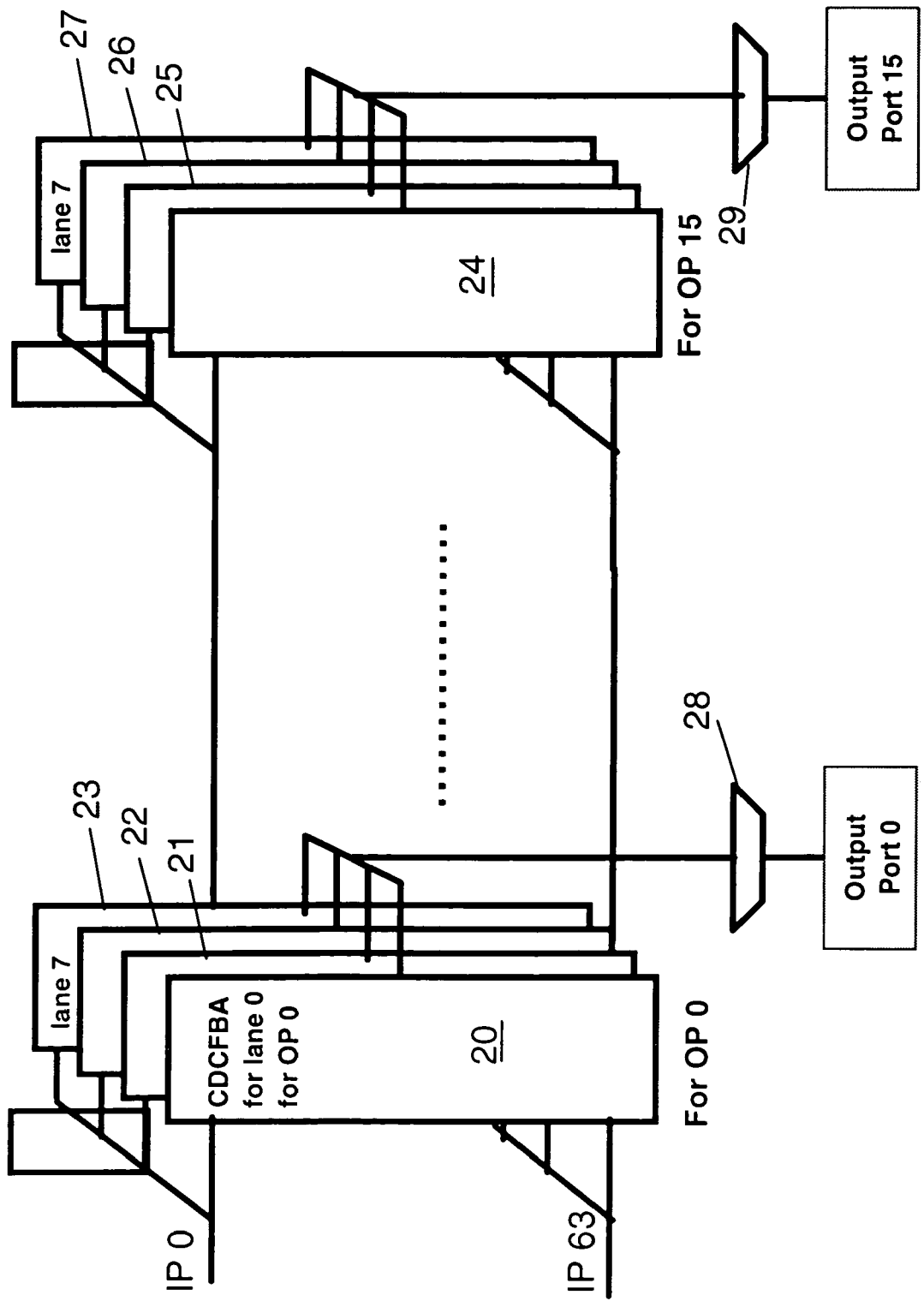
FIG. 2 is a schematic representation illustrating a structural overview of a switch fabric in a 64×16 switch configuration according to a preferred embodiment of the invention.

With reference now to FIG. 2 first, a structural overview is given on a preferred embodiment of the present invention. This is a switching device having a plurality of m=64 input ports abbreviated herein as IP 0, . . . 63 and a plurality of n=16 output ports, abbreviated herein as OP 0, . . . 15. In this switching configuration a plurality of 8 different lanes, i.e., lane 0 to lane 7 is provided. In order to improve the clarity of the drawing the graphical representation of the switch configuration is reduced to 4 lanes.

A prior art input control logic not depicted in the drawing is provided which is able to scan the total of input ports for incoming data packets. The header information of said data packets is evaluated within the input control logic in order to determine to which output port the package has to be switched, and with which level of priority this has to be done in the post-connected switching logic. Thus, at the input side of FIG. 2, which will be described later below, in addition to the information 'data present' or 'data absent', two further control data will be evaluated from an input port, namely, the output port number and the lane number. Thus, this control information is forwarded to the input ports depicted in FIG. 2, whereas the data corresponding to respective output ports and lane numbers is forwarded and stored into a separate fast accessible data storage. This data storage is also not depicted in the drawing as this does not explicitly form part of the present invention. It should be noted, however, that this storage for the use data is accessed via control signals that are generated within the inventive part of the switching configuration, as it is roughly depicted in FIGS. 2 and 3.

According to this preferred embodiment for each output port and for each lane a so-called COMBINED AND DATA COMPRESSED FIFO-BASED ARBITRATION logic block is provided. Said arbitration logic block is further herein abbreviated as CDCFBA, see the blocks 20 to 23 for output port 0 and the CDCFBA blocks 24 to 27 for output port 15. For sake of improved clarity of the drawing the CDCFBA blocks corresponding to output ports 1, 2, . . . 14 are not depicted in the drawing. The basic contents of a CDCFBA block is depicted in more detail in FIG. 3 and will be described later below.

Prior art write access logic is provided between each of the plurality of 64 input ports and each CDCFBA block. Thus, signals that are present on any of the input ports can be sensed and forwarded into the total of 8*16=128 CDCFBA blocks, (8 lanes, 16 output ports).

Each CDCFBA block is connected with its corresponding output port via a multiplexer logic depicted with reference signs 28, 29 the basic function of which is multiplexing the plurality of 8 CDCFBA blocks to a single particular output port.

Figure 2A:
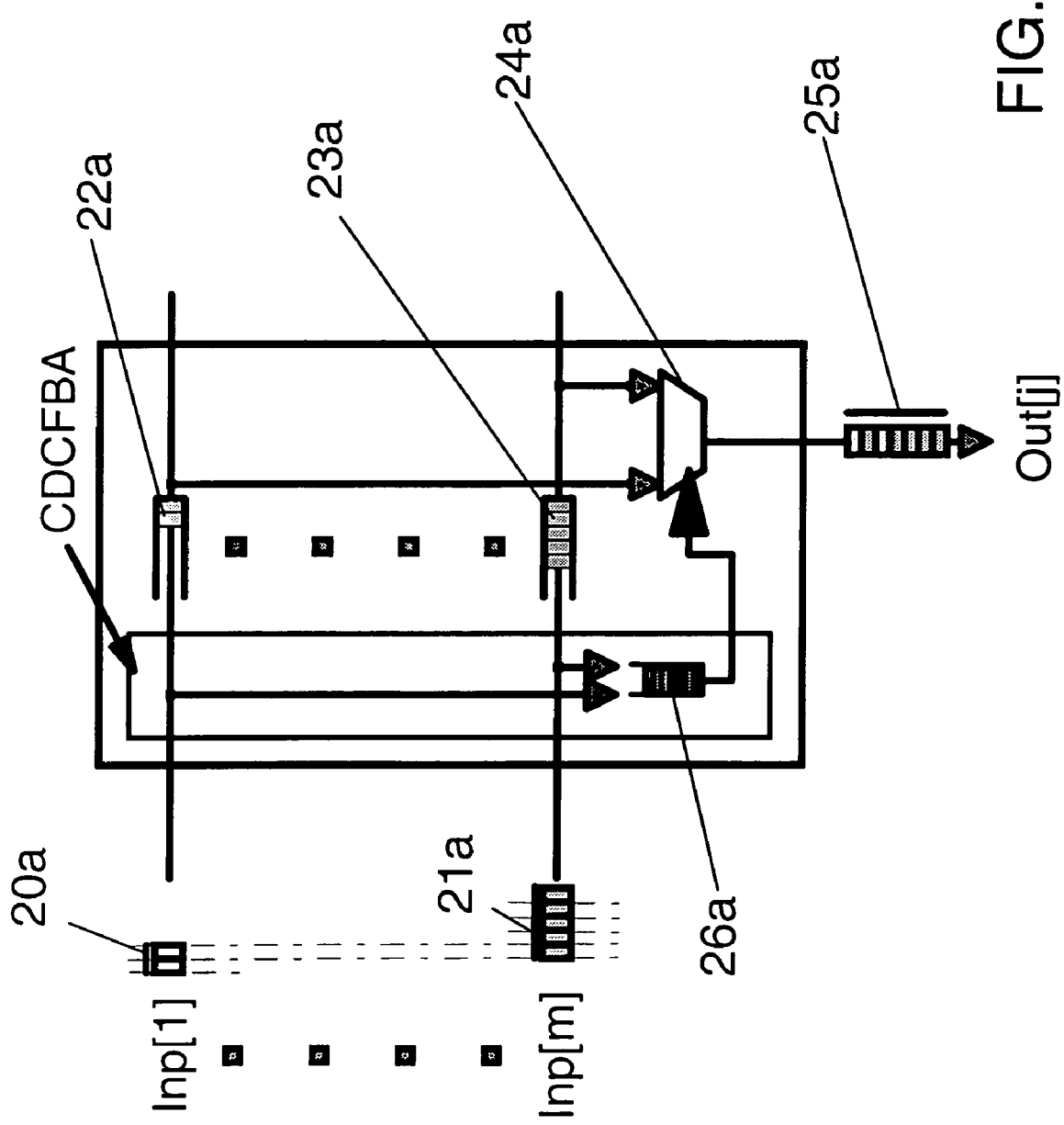
FIG. 2a is a schematic high-level abstraction representation of the Combined and Data Compressed FiFo Based Arbitration (CDCFBA) scheme from FIG. 2, when applied to a buffer crossbar architecture.

With additional reference to FIG. 2a, a high-level abstraction representation of the so-called CDCFBA is depicted when applied within a buffer crossbar architecture. The characteristics of the system under description are as follows: There are 'm' input ports, each serving a line having the same capacity. For sake of improved clarity of the drawing, only one output port 'j' is represented, and the system is assumed to operate with a unique class of traffic per output port (one single lane). The time is slotted, and incoming packets destined to output port 'j' have different arrival times at input port '1' to 'm'. In the example depicted here, only packets destined to output 'j' are represented, see ref. sign 20a, 21a.

Input '1' receives 2 two packets 20a which are en-queued per destination ('j') into queue 22a and at the corresponding input ('1'). Input 'm' receives 5 five packets 21a which are en-queued per destination ('j') into queue 23a and at the corresponding input ('m').

A buffer storage 26a keeps track of the inter-arrival sequence of packets among the multiple input ports and stores this information into a compressed form for latter retrieve. The output queue scheduler 24a uses this compressed information from 26a and schedules the outgoing packets from the distributed set of output queues 22a, 23a. The sequence of outgoing packets 25a complies with a real output queue switch model.

Figure 3:
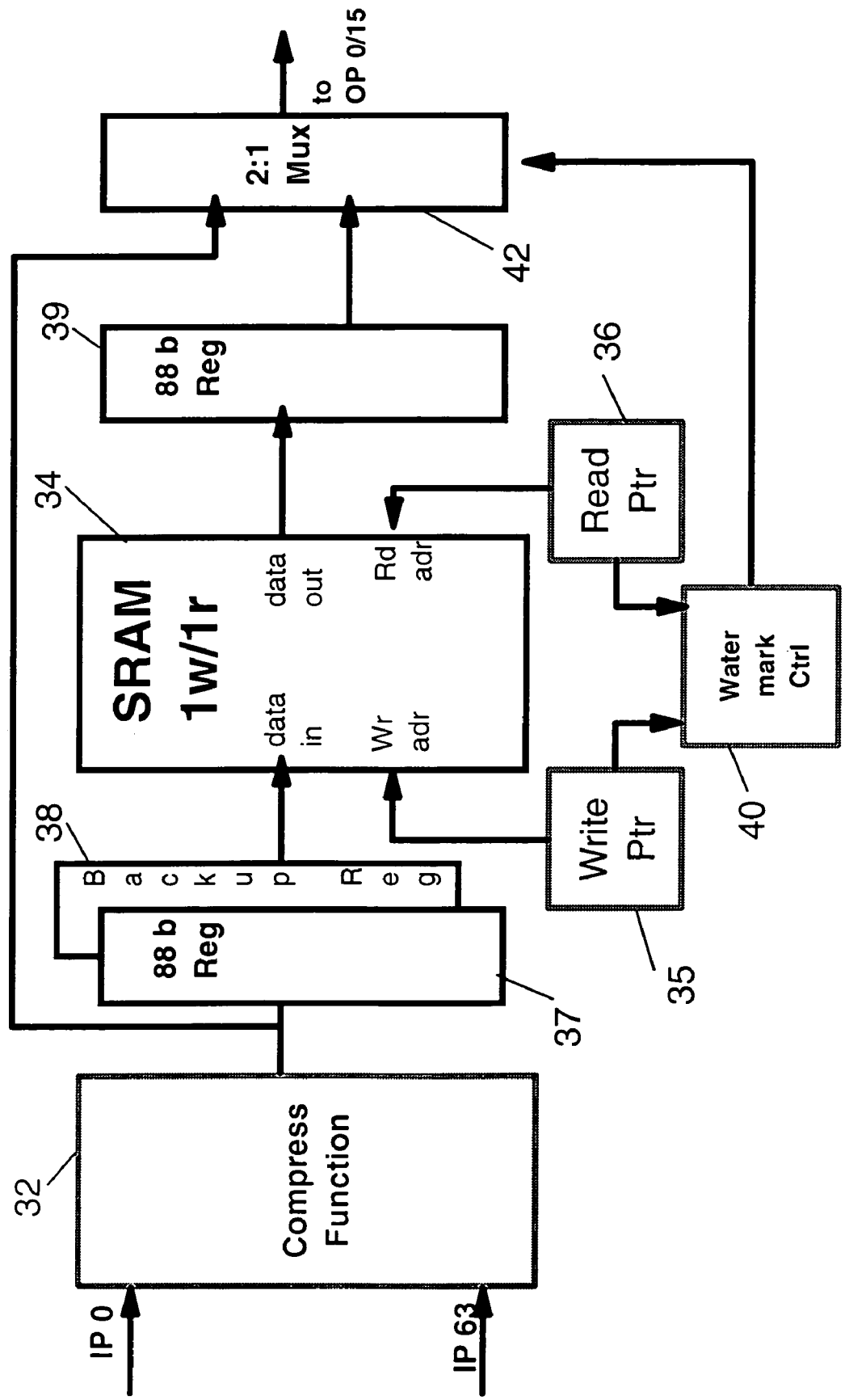
FIG. 3 is a schematic representation showing the details of a CDCFBA block from FIG. 2 including the additional bypass feature.

With additional reference to FIG. 3 more details are given on the internal logic implemented in each CDCFBA block 21 to 27 from FIG. 2.

The input information comprising the input port numbers for the corresponding output port and lane number is input into a hardware logic module 32, the function of which is to compress the input vector as it was set out above.

In the preferred embodiment a compress function logic block 32 is provided for each lane. Thus, in total, a number of 8 compress function logic blocks is provided for the entire switching device. The compression unit 32 processes the incoming information: ip#, op# and lane# in order to build an input port subgroup index, GNR, and to build a subgroup port number bit sequence (GPNR).

In the example presented herein the plurality of 64 input ports is divided into subgroups -denoted with reference sign 54 in FIG. 5A, exemplarily, of 8 ports. Thus, the subgroup number consists of three bits ('000, . . . 111'). Thus, with the subgroup number each of the 8 subgroups may be uniquely identified. The associated subgroup port number bit sequence is provided 8 times per subgroup wherein each GPNR represents a specific port number according to the position of a respective port within a subgroup.

In this compression scheme three bits are used for identifying a subgroup and further 8 bits are used for identifying the position of up to 8 ports that are active concurrently. Thus, 3+8=11 bits are used per subgroup. Having 8 subgroups in total only 8*11=88 bits are used in order to store the input status in any post-connected memory for buffering it.

An example: The input ports number 16, 18, 19 and 20 carry a signal representing "data present". Then the third subgroup is concerned which means that the compression unit builds up a 3-bit subgroup number '011', and builds up a subgroup port number bit sequence of '10111000', as the third subgroup extends from port number 16 to port number 23. Assume a case in which no data is present at the rest of the input ports a compression vector is established by the compression unit, having a maximum length of 88 bit in which the above 11-bit sequence (subset) extends from bit position 0, beginning of the third subgroup to bit position 10, and is then aligned or shifted to the current write position of register 37.

Thus, an SRAM memory 34 is provided within a CDCFBA block which may store a plurality of 88 bit segments. Thus, in the worst case the inventive embodiment allows to capture up to 8 ports within one 88 bit wide SRAM entry. This is, of course a quite rare case because all data would cover the whole range of input ports, and would be destined for a single output port, and would have all the same priority.

The SRAM memory is equipped with prior art access logic for one write and one concurrent read access (1w/1r). As should reveal from the foregoing section any of the SRAM memory elements 34 is written to be controlled by the compress function 32 which is symbolized by a respective write pointer 35, which usually points to the next free position.

The read access to the plurality of SRAM memories 34, however, is controlled by the before-mentioned control logic that covers the access to the actual data storage. Thus, the read access is basically controlled by the priority level and the respective output port number. A respective read pointer 36 is provided correspondingly. Thus, dependent of the size of each SRAM memory a quite large amount of data may be buffered temporarily in order to temporarily solve an output contention situation or to provide a balance for a different input and output speed.

Further, it should be noted that the write-process between compress unit 32 and SRAM 34 is done including a 88-bit write register 37, which is used to collect up to 88 bit of information from the compression unit to save the SRAM write operations. After 8 subgroup numbers are written, the register 37 content is loaded into the SRAM 34 memory while the write pointer 35 defines the write address.

A backup register 38 is provided as the compression unit 32 may deliver up to 88 bit every cycle which otherwise could lead to a register 37 overrun and a loss of information. A corresponding 88-bit register 39 is provided for the read access via the read pointer 36. The read process is basically done according to prior art techniques.

According to an additional, optional feature a bypass function is provided which helps to save one cycle in the case in which the SRAM 34 memory is empty. In this case data can directly be forwarded from the compress function block 32 to the output port (right margin of FIG. 3). In order to do this a small, dedicated control logic 40 is provided the input of which is fed by a copy of the write pointer and the respective current read pointer. This logic 40 is referred to as "watermark control", as it controls the degree up to which the SRAM 34 memory is filled with compression data. If the read pointer 36 and the write pointer 35 indicate that the SRAM memory is empty, a 2:1 multiplexer 42 is switched in order to realize the bypass. Thus, latency is saved which is a key requirement in particular for server applications.

In order to implement this, one "valid-bit" is provided indicating that the SRAM has at least one valid entry. This bit is reset to zero, if the read pointer is equal to the write pointer what indicates an empty SRAM for the bypass.

Figure 4:
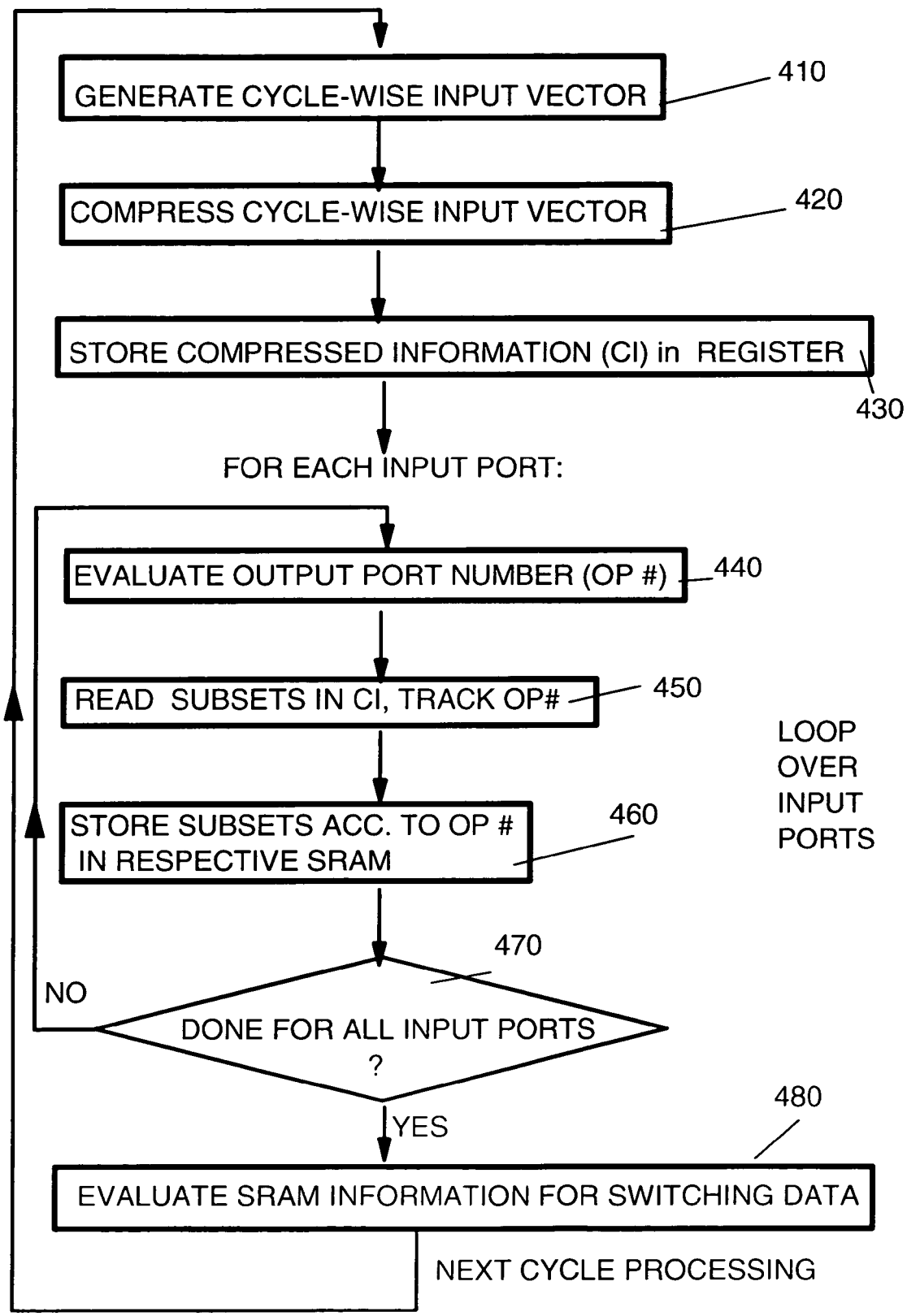
FIG. 4 is a schematic representation illustrating basic steps in a control flow of a preferred embodiment.

Next, with reference to FIG. 4 the control flow of the logic implemented according to the embodiment above will be described in more detail.

This processing is done cycle-wise which is expressed by the outer loop connecting step 480 with step 410.

In a first step 410 of said loop the before-mentioned input vector is generated by the compress function 32, see back to FIG. 3. This is done by reading the information "input port number, output port number and lane number" from each of the input ports 0 to 63. In a second step 420 said input data is compressed according to the example given above, and thus the 88-bit vector is calculated. In a further step 430 the compressed information (CI in the drawing) is stored into the register 37.

Then, a loop over all input ports within the compressed information vector is performed extending from step 440 to end decision 470: within this loop the compressed information vector is scanned and subsets of it are extracted according to the output port number that is relevant for each section.

Thus, in more detail, in a first step 440 the output port number (OP#), which is passed to the compress function 32 via the bitmap routing information field of the packet header 18, is determined for each input port, step 440.

Then, in a next step 450, for each input port a respective subset in the compressed information is read while still tracking the respective output port number. Then, in a further step 460, the actual storing of the 11-bit wide subsets as given in the example above, takes place according to a respective output port number. Thus, the correct SRAM 34 must be selected with the current output port number and the current lane number.

Then a check is performed if the input vector has been completely processed, which leads to a decision 470. Thus, in the NO-case the procedure is repeated beginning with step 440 again while in the other case the whole input vector has been processed. In this case the write process into a respective plurality of different SRAM memory elements 34 has completed, step 480, thus, the information stored in SRAM 34 can be evaluated to route the data packets according to prior art. Then it is branched back to step 410 in order to begin with the processing for the next cycle.

With additional reference to FIGS. 5A, 5B and 5C, for three subsequent cycles 0,1,2 the bit-states are exemplarily depicted for writing into the register 37 (third row), for writing into backup register 38, see the 4. row, and for writing into any specific SRAM memory element 34, see the 5. row. The second row just indicates the bit position for respective bits within the before-mentioned 88-bit compression vector. Non-relevant bits are denoted with an "x". Between each write process the write pointer is advanced preferably by 11 bits (gnr+gpnr). Subgroup numbers (gnr) are depicted with reference sign 50, subgroup port number bits (gpnr) are depicted with 52, and subgroups are depicted with reference sign 54, exemplarily in FIG. 5A only, in order to improve clarity of the drawings.

In cycle 0, see FIG. 5A, data is assumed to be present only in ports # 0, 1, 2, and 3. This information is encoded by respective bits, see the arrows, the value setting of which is "1". A write is not yet done, neither to the SRAM 34 nor to the Backup register 38.

In cycle 1, see FIG. 5B, data is assumed to be present only in ports #0,14,15. This information is encoded by the respective subgroup numbers '000', '001' with the respective subgroup number bit sequences '1xxxxxxx' and 'xxxxxx11'. Since the last write operation to the register 37 was in subgroup 0, the new write extends from bit position 11 to 32.

In cycle 2, see FIG. 5C, data is assumed to be present on all input ports. This information is encoded by the respective subgroup numbers '000', . . . '111' with the respective subgroup number bit sequences '11111111'. Since the last write operation was on bit position 32, the new write extends from bit position 33 to 87 of register 37 and from bit position 0 to 32 of the backup register 38.

Further, the contents of register 37 is loaded into the SRAM 34, and backup register 38 takes over the role of register 37 for further writes as it is known from prior art.

The present invention can basically be realized in hardware, software, or a combination of hardware and software. The primary application, however will be a hardware implementation which is designed for lowest latency and small chip area consumption, e.g., for a non-blocking switch network.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

Thus, for example, changes made to the described inventive concepts may be obvious to a person skilled in the art, when certain assumptions being a base for the current concept as e.g., the requirement that all output ports should be able to be read concurrently, would change.

Further, a separate coding logic can be provided which encodes the association between SRAM storage location and output/lane destination in a modified configuration in which a single memory device is provided for more than one output port and lane.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A data packet switching method in which a buffer is used for buffering input control information about incoming packets at a plurality of m input ports to be switched to a plurality of n output ports of a respective switching device, the method being enabled for concurrent read operation from at least a subtotal of output ports, the method comprising the steps of:
   a.) compressing said input control information from an indicator bit vector, an indicator bit representing either information data present or data absent on a respective one of said data input ports,
   b.) storing respective subsets of said compressed control information according to an output port indication evaluated from packet header information into a respective buffer storage provided per output port, and
   c.) evaluating the compressed control information from the total of buffer storages for switching the respective data packet to the desired switching device output port, said compressing step further comprising building an input port subgroup index for addressing respective subgroups of the total of input ports, each subgroup covering a predetermined plurality of input ports, and providing subgroup indication means for each subgroup for tracking at which input ports of a subgroup data is concurrently present.

2. The method according to claim 1 in which said subgroup indication means is a bit sequence in which each bit indicates either data present or data not present for a respective input port forming part of a respective subgroup.

3. The method according claim 2 in which each bit of said bit sequence encodes or is derived from a respective input port number within a subgroup.

4. The method according to claim 1 in which each subgroup covers a number of 8 input ports.

5. The method according to claim 1, in which a plurality of buffer storages is provided for a respective plurality of priority lanes.

6. The method according to claim 1 in which said buffer storages are FIFO-operated.

7. The method according to claim 1, further comprising the step of bypassing the buffer storage when it does not hold data.

8. A chip circuit for use in a data packet switching method in which a buffer is used for buffering input control information about incoming packets at a plurality of m input ports to be switched to a plurality of n output ports of a respective switching device, the method being enabled for concurrent read operation from at least a subtotal of output ports, the method comprising the steps of:
   a.) compressing said input control information from an indicator bit vector, an indicator bit representing either information data present or data absent on a respective one of said data input ports,
   b.) storing respective subsets of said compressed control information according to an output port indication evaluated from packet header information into a respective buffer storage provided per output port, and
   c.) evaluating the compressed control information from the total of buffer storages for switching the respective data packet to the desired switching device output port, said compressing step further comprising building an input port subgroup index for addressing respective subgroups of the total of input ports, each subgroup covering a predetermined plurality of input ports, and providing subgroup indication means for each subgroup for tracking at which input ports of a subgroup data is concurrently present.

9. The chip circuit performing the method according to claim 8 in which said subgroup indication means is a bit sequence in which each bit indicates either data present or data not present for a respective input port forming part of a respective subgroup.

10. The chip circuit performing the method according claim 9 in which each bit of said bit sequence encodes or is derived from a respective input port number within a subgroup.

11. The chip circuit performing the method according to claim 10 in which each subgroup covers a number of 8 input ports.

12. The chip circuit performing the method according to claim 8, in which a plurality of buffer storages is provided for a respective plurality of priority lanes.

13. The chip circuit performing the method according to claim 8 in which said buffer storages are FIFO-operated.

14. The chip circuit performing the method according to claim 8, further comprising the step of bypassing the buffer storage when it does not hold data.

* * * * *